(12) United States Patent
Huang et al.

(10) Patent No.: US 11,868,530 B2
(45) Date of Patent: Jan. 9, 2024

(54) ACCURATE CONTROL METHOD OF VISUAL STIMULI FOR BRAIN-COMPUTER INTERFACE

(71) Applicant: FUZHOU UNIVERSITY, Jinjiang (CN)

(72) Inventors: Zhihua Huang, Jinjiang (CN); Yingjie Wu, Jinjiang (CN)

(*) Notice: Subject to any disclaimer, the term of this patent is extended or adjusted under 35 U.S.C. 154(b) by 0 days.

(21) Appl. No.: 17/435,172

(22) PCT Filed: Jan. 28, 2021

(86) PCT No.: PCT/CN2021/074084
§ 371 (c)(1),
(2) Date: Aug. 31, 2021

(87) PCT Pub. No.: WO2022/001098
PCT Pub. Date: Jan. 6, 2022

(65) Prior Publication Data
US 2023/0136433 A1    May 4, 2023

Related U.S. Application Data

(63) Continuation of application No. PCT/CN2021/074084, filed on Jan. 28, 2021.

(30) Foreign Application Priority Data

Jul. 3, 2020 (CN) .......................... 202010629983.0

(51) Int. Cl.
*G06F 3/01* (2006.01)
*G06T 1/20* (2006.01)
*G06F 3/14* (2006.01)

(52) U.S. Cl.
CPC ............... *G06F 3/015* (2013.01); *G06F 3/14* (2013.01); *G06T 1/20* (2013.01)

(58) Field of Classification Search
CPC ... G06F 3/01; G06F 3/015; G06F 3/14; G06T 1/20
(Continued)

(56) References Cited

U.S. PATENT DOCUMENTS

2019/0043154 A1* 2/2019 Lawrence .............. G09G 5/363
2020/0037911 A1* 2/2020 Hasegawa .............. G09B 21/00

* cited by examiner

*Primary Examiner* — Calvin C Ma
(74) *Attorney, Agent, or Firm* — Jose Cherson Weissbrot

(57) ABSTRACT

Disclosed is an accurate control method of visual stimuli for a brain-computer interface. It is a common approach for brain-computer interfaces to evoke specific EEG signal patterns by visual stimuli and recognize the EEG signal patterns in real time. However, due to the influence of process scheduling, a process showing the visual stimuli may sometimes be dispatched out of a CPU, leading to the difficulty in guaranteeing the accuracy of the visual stimuli and the recognition effect of the EEG signal patterns. The invention designs a control method to support accurate visual stimuli of a brain-computer interface. A software system implementing the method comprises a generator, an actuator and a controller. The generator automatically generates an image sequence according to test requirements. The actuator is a module running on a GPU. At the beginning of a trail, the controller asynchronously calls an interface of the actuator to start the actuator, and the actuator accurately shows the image sequence generated by the generator. At the end of the trail, the controller asynchronously calls an interface of the actuator to stop showing visual stimuli.

4 Claims, 1 Drawing Sheet

(58) Field of Classification Search
USPC .......................................................... 345/156
See application file for complete search history.

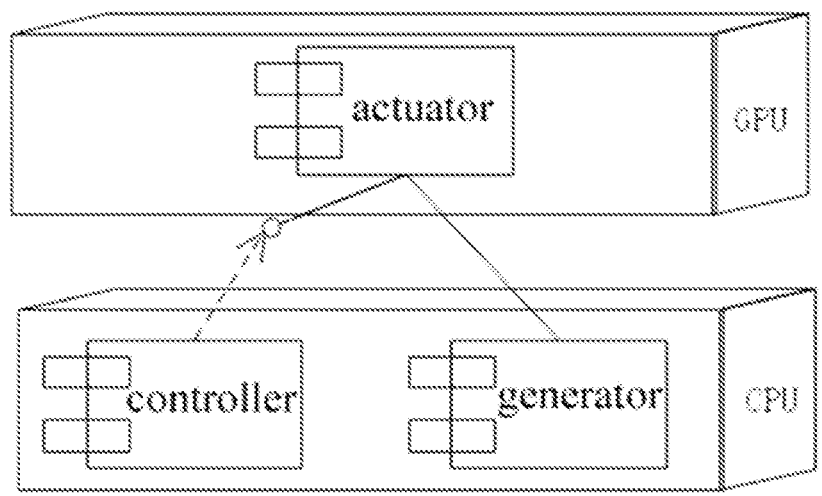

ACCURATE CONTROL METHOD OF VISUAL STIMULI FOR BRAIN-COMPUTER INTERFACE

BACKGROUND OF THE INVENTION

1. Technical Field

The invention relates to an accurate control method of visual stimuli for a brain-computer interface.

2. Description of Related Art it is a common approach for brain-computer interfaces to evoke specific electroencephalogram (EEG) signal patterns by visual stimuli and recognize the EEG signal patterns in real time. However, due to the influence of process scheduling, the process showing the visual stimuli may sometimes be dispatched out of the CPU, leading to the difficulty of guaranteeing the accuracy of the visual stimuli. In view of this, the invention designs a control method to support accurate visual stimuli of brain-computer interfaces.

BRIEF SUMMARY OF THE INVENTION

The objective of the invention is to overcome the defects of the prior art by providing an accurate control method of visual stimuli for a brain-computer interface.

The technical solution adopted by the invention to fulfill the above objective is an accurate control method of visual stimuli for a brain-computer interface, which is implemented by a software system consisting of a generator, an actuator and a controller. The functions of the generator, actuator and controller and their correlations are as follows.

The generator, a module running on a CPU, interacts with an experimenter to receive accurate visual stimuli parameters, and automatically generates an image sequence as required by the parameters according to the refresh rate of a display. The actuator, a module running on a GPU, has two interfaces "start" and "stop" that both support asynchronous calls. When the interface "start" is called, the actuator starts running to show the image sequence, generated by the generator, on a screen frame by frame. When the interface "stop" is called, the actuator stops running. The controller, a module running on the CPU, asynchronously calls the interface "start" of the actuator at the beginning of a trial to start showing accurate visual stimuli, then accesses a hardware interface connected with an electroencephalograph instrument to write a marker into electroencephalogram signals, and asynchronously calls the interface "stop" of the actuator at the end of the trial to stop showing the accurate visual stimuli.

In one embodiment of the invention, the implementation points of the generator include:

At run time, the generator is a separate process. The generator has an interactive interface, by which the experimenter is allowed to describe showing patterns of the accurate visual stimuli. The showing patterns include a background image, the location and shape of a stimuli area, and flicker patterns of stimuli. The flicker patterns include random sequence patterns and sine wave patterns. Regarding the random sequence patterns, 0 represents "dark", 1 represents "bright", and a random sequence consisting of 0 and 1 is used to control the stimuli area to be bright or dark on each frame. Regarding the sine wave patterns, a designated sine function is used to determine the brightness of the stimuli area on each frame. In the random sequence patterns, the experimenter needs to specify the random sequence, and in the sine wave patterns, the experimenter needs to specify the amplitude, frequency and phase of the sine function. An algorithm implemented in the generator automatically generates the image sequence according to the refresh rate of the display after the parameters are input by the experimenter.

In one embodiment of the invention, the implementation points of the actuator include:

The actuator, a module running on the GPU, will not be influenced by process scheduling of the operating system at run time, and is able to accurately refresh the screen using the image sequence generated by the generator according to the refresh rate of the screen. The interfaces "start" and "stop" allow a caller to start or stop showing the visual stimuli. The interfaces "start" and "stop" both support asynchronous calls and will return immediately after being successfully called by the caller.

In one embodiment of the invention, the implementation points of the controller include:

At run time, the controller is a separate process. An asynchronous call mechanism between the controller and the actuator ensures that the controller will not be blocked by calls, and the controller returns immediately after successfully calling the interfaces "start" and "stop" of the actuator. The controller calls the interface "start" at a specific moment as required by the experimenter to start the trial and calls the interface "stop" to stop the trial. The controller has a function of accessing the hardware interface connected to the electroencephalograph instrument and immediately writes the marker into the electroencephalograph signals using this function after calling the interface "start" of the actuator. The controller also has a function of acquiring the electroencephalograph signals in real time. The controller acquires the electroencephalograph signals in real time by sharing a memory block with a process of collecting the electroencephalograph signals. The process of collecting the electroencephalograph signals stores new electroencephalograph signal data blocks in the shared memory block, and the controller acquires the new electroencephalograph signal data blocks from the memory block. To ensure that the electroencephalograph signal data blocks are correctly transmitted between the process of collecting the electroencephalograph signals and the controller, the two processes need to be kept in a synchronous relationship, which is referred to as a producer-consumer model and implemented by a semaphore mechanism. In addition, the controller also has a function of processing the electroencephalograph signals in real time by a preset algorithm. Every time obtaining one electroencephalograph signal data block, the controller processes the corresponding signals, generates a feedback according to a processing result, and shows the feedback to the user at the end of the trial.

Compared with the prior art, the invention has the following beneficial effects:

In the prior art, it is hard to guarantee the accuracy of visual stimuli and the recognition effect of electroencephalogram signal patterns. The accurate control method of visual stimuli for a brain-computer interface overcomes the defects.

BRIEF DESCRIPTION OF THE SEVERAL VIEWS OF THE DRAWINGS

FIG. 1 is a component diagram of a software system implementing the invention.

DETAILED DESCRIPTION OF THE INVENTION

The technical solution of the invention will be specifically described below in conjunction with the accompanying drawing.

The invention provides an accurate control method of visual stimuli for a brain-computer interface. As shown in FIG. 1, a software system implementing the method consists of a generator, an actuator and a controller, the functions and correlations of which are as follows:

The generator, a module running on a CPU, interacts with an experimenter to receive accurate visual stimuli parameters, and automatically generates an image sequence as required by the parameters according to the refresh rate of a display (in this embodiment, the refresh rate of the display is 60 frames per second);

The actuator, a module running on a GPU, has two interfaces "start" and "stop" that both support asynchronous calls. When the interface "start" is called, the actuator starts showing the image sequence, generated by the generator, on a screen frame by frame. When the interface "stop" is called, the actuator stops running;

The controller, a module running on the CPU, asynchronously calls the interface "start" of the actuator at the beginning of a trial to start showing accurate visual stimuli, then accesses a hardware interface connected with an electroencephalograph instrument to write a marker into electroencephalogram signals, and asynchronously calls the interface "stop" of the actuator at the end of the trial to stop showing the accurate visual stimuli.

In this embodiment, the generator further has the following characteristics:

At run time, the generator is a separate process. The generator has an interactive interface, by which the experimenter is allowed to describe showing patterns of the accurate visual stimuli. The showing patterns include a background image, the location and shape of a stimuli area, and flicker patterns of stimuli. The flicker patterns include random sequence patterns and sine wave patterns. Regarding the random sequence patterns, 0 represents "dark", 1 represents "bright", and a random sequence consisting of 0 and 1 is used to control the stimuli area to be bright or dark on each frame. Regarding the sine wave patterns, a designated sine function is used to determine the brightness of the stimuli area on each frame. In the random sequence patterns, the experimenter needs to specify the random sequence, and in the sine wave patterns, the experimenter needs to specify the amplitude, frequency and phase of the sine function. An algorithm implemented in the generator automatically generates the image sequence according to the refresh rate of the display after the parameters are input by the experimenter.

In this embodiment, the actuator further has the following characteristics:

The actuator, a module running on the GPU, will not be influenced by process scheduling of an operating system at run time, and is able to accurately refresh the screen using the image sequence generated by the generator according to the refresh rate of the screen (in this embodiment, the refresh rate of the display is 60 frames per second). The interfaces "start" and "stop" of the actuator allow a caller to start or stop showing the visual stimuli. The interfaces "start" and "stop" of the actuator both support asynchronous calls and will return immediately after being successfully called by the caller.

In this embodiment, the controller further has the following characteristics:

At run time, the controller is a separate process. An asynchronous call mechanism between the controller and the actuator ensures that the controller will not be blocked by calls, and the controller returns immediately after successfully calling the interfaces "start" and "stop" of the actuator. The controller calls the interface "start" of the actuator at a specific moment as required by the experimenter to start the trail and calls the interface "stop" of the actuator to stop the trail. The controller has a function of accessing the hardware interface connected to the electroencephalograph instrument and immediately writes the marker into the electroencephalograph signals using this function after calling the interface "start" of the actuator; the controller also has a function of acquiring the electroencephalograph signals in real time. The controller acquires the electroencephalograph signals in real time by sharing a memory block with a process of collecting the electroencephalograph signals. The process of collecting the electroencephalograph signals stores collected new electroencephalograph signal data blocks in the shared memory block, and the controller acquires the new electroencephalograph signal data blocks from the memory block. To ensure that the electroencephalograph signal data blocks are correctly transmitted between the process of collecting the electroencephalograph signals and the controller, the two processes need to be kept in a synchronous relationship, which is referred to as a producer-consumer model and implemented by a semaphore mechanism. In addition, the controller also has a function of processing the electroencephalograph signals in real time using a preset algorithm. Every time obtaining one electroencephalograph signal data block, the controller processes corresponding signals, generates a feedback according to a processing result, and shows the feedback to users at the end of the trail.

The above embodiments are preferred ones of the invention. All functions fulfilled by variations made based on the technical solution of the invention without departing from the scope of the technical solution should also fall within the protection scope of the invention.

What is claimed is:

1. An accurate control method of visual stimuli for a brain-computer interface, being implemented by a software system consisting of a generator, an actuator and a controller, functions and correlations of which are as follows:

the generator, a module running on a CPU, interacts with an experimenter to receive accurate visual stimuli parameters, and automatically generates an image sequence as required by the parameters according to a refresh rate of a display; the actuator, a module running on a GPU, has two interfaces "start" and "stop" that both support asynchronous calls; when the interface "start" is called, the actuator starts running to show the image sequence, generated by the generator, on a screen frame by frame at run time; and when the interface "stop" is called, the actuator stops running; and the controller, a module running on the CPU, asynchronously calls the interface "start" of the actuator at the beginning of a trail to start showing accurate visual stimuli, then accesses a hardware interface connected with an electroencephalograph instrument to write a marker into electroencephalogram signals, and asynchronously calls the interface "stop" of the actuator at the end of the trail to stop showing the accurate visual stimuli.

2. The accurate control method of visual stimuli for a brain-computer interface according to claim 1, wherein the generator is implemented as follows:

at run time, the generator is a separate process; the generator has an interactive interface, by which the experimenter is allowed to describe showing patterns of the accurate visual stimuli of a brain-computer interface; the showing patterns include a background image, the location and shape of a stimuli area, and flicker patterns of stimuli; the flicker patterns include random sequence patterns and sine wave patterns; regarding the random sequence patterns, 0 represents "dark", 1 represents "bright", and a random sequence consisting of 0 and 1 is used to control the stimuli area to be bright or dark on each frame; regarding the sine wave patterns, a designated sine function is used to determine the brightness of the stimuli area on each frame; in the random sequence patterns, the experimenter needs to specify the random sequence, and in the sine wave patterns, the experimenter needs to specify an amplitude, a frequency and a phase of the sine function; and an algorithm implemented in the generator automatically generates the image sequence according to the refresh rate of the display after the parameters are input by the experimenter.

3. The accurate control method of visual stimuli for a brain-computer interface according to claim 1, wherein the actuator is implemented as follows:

the actuator, a module running on the GPU, will not be influenced by process scheduling of an operating system at run time, and is able to accurately refresh the screen using the image sequence generated by the generator according to the refresh rate of the screen; the interfaces "start" and "stop" of the actuator allow a caller to start or stop showing the visual stimuli; and the interfaces "start" and "stop" of the actuator both support asynchronous calls and will return immediately after being successfully called by the caller.

4. The accurate control method of visual stimuli for a brain-computer interface according to claim 1, wherein the controller is implemented as follows:

at run time, the controller is a separate process; an asynchronous call mechanism between the controller and the actuator ensures that the controller will not be blocked by calls, and the controller returns immediately after successfully calling the interfaces "start" and "stop" of the actuator; the controller calls the interface "start" of the actuator at a specific moment as required by the experimenter to start the trail and calls the interface "stop" of the actuator to stop the trail; the controller has a function of accessing the hardware interface connected to the electroencephalograph instrument and immediately writes the marker into the electroencephalograph signals using this function after calling the interface "start" of the actuator; the controller also has a function of acquiring the electroencephalograph signals in real time; the controller acquires the electroencephalograph signals in real time by sharing a memory block with a process of collecting the electroencephalograph signals; the process of collecting the electroencephalograph signals stores collected new electroencephalograph signal data blocks in the shared memory block, and the controller acquires the new electroencephalograph signal data blocks from the memory block; to ensure that the electroencephalograph signal data blocks are correctly transmitted between the process of collecting the electroencephalograph signals and the controller, the two processes need to be kept in a synchronous relationship, which is referred to as a producer-consumer model and implemented by a semaphore mechanism; in addition, the controller also has a function of processing the electroencephalograph signals in real time using a preset algorithm, and every time obtaining one electroencephalograph signal data block, the controller processes corresponding signals, generates a feedback according to a processing result, and shows the feedback to users at the end of the trail.

* * * * *